US012451652B2

(12) United States Patent
Tanaka et al.

(10) Patent No.: US 12,451,652 B2
(45) Date of Patent: Oct. 21, 2025

(54) CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Tanaka, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 372 days.

(21) Appl. No.: 18/016,759

(22) PCT Filed: Jul. 16, 2021

(86) PCT No.: PCT/JP2021/026811
§ 371 (c)(1),
(2) Date: Jan. 18, 2023

(87) PCT Pub. No.: WO2022/030226
PCT Pub. Date: Feb. 10, 2022

(65) Prior Publication Data

US 2023/0291148 A1 Sep. 14, 2023

(30) Foreign Application Priority Data

Aug. 6, 2020 (JP) ................................ 2020-133701

(51) Int. Cl.
*H01R 13/631* (2006.01)
*H01R 12/91* (2011.01)
(Continued)

(52) U.S. Cl.
CPC ......... *H01R 13/6315* (2013.01); *H01R 12/91* (2013.01); *H01R 24/50* (2013.01); *H01R 24/54* (2013.01)

(58) Field of Classification Search
CPC .... H01R 13/6315; H01R 12/91; H01R 24/50; H01R 24/54; H01R 9/0515
See application file for complete search history.

(56) References Cited

U.S. PATENT DOCUMENTS 5,879,177 A 3/1999 Honma
5,980,290 A * 11/1999 Meynier ............ H01R 13/6315 439/246
(Continued)

FOREIGN PATENT DOCUMENTS

CN 102437477 A 5/2012
CN 102946033 A 2/2013
(Continued)

OTHER PUBLICATIONS

International Search Report issued on Sep. 28, 2021 for WO 2022/030226 A1 (4 pages).

*Primary Examiner* — Tulsidas C Patel
*Assistant Examiner* — Carlos E Lopez-Pagan
(74) *Attorney, Agent, or Firm* — Venjuris, P.C.

(57) ABSTRACT

It is aimed for miniaturization. A connector device is provided with a first connector (10), a second connector (40) provided to face the first connector (10), an adapter (20) for connecting the first and second connectors (10, 40), resilient holding portions (14) formed in the first connector (10), having a shape retention force capable of holding the adapter (20) in a fixed posture with respect to the first connector (10) and being resiliently deformable, and a first guide portion (42) and second guide portions (47) for absorbing position shifts of the first and second connectors (10, 40) by inclining
(Continued)

the adapter (20) with respect to the first connector (10) while resiliently deforming the resilient holding portions (14).

7 Claims, 14 Drawing Sheets

(51) Int. Cl.

| | |
|---|---|
| ***H01R 24/50*** | (2011.01) |
| ***H01R 24/54*** | (2011.01) |

(56) References Cited

U.S. PATENT DOCUMENTS

| | | | | |
|---|---|---|---|---|
| 6,497,579 | B1 | 12/2002 | Garbini | |
| 9,735,531 | B2 * | 8/2017 | Zhu | H01R 12/737 |
| 2001/0051452 | A1 * | 12/2001 | Walker | H01R 13/6315 439/248 |
| 2012/0276788 | A1 * | 11/2012 | Takano | H01R 13/631 439/784 |
| 2012/0295478 | A1 * | 11/2012 | Mrowka | H01R 24/50 439/578 |
| 2015/0118899 | A1 * | 4/2015 | Hugel | H01R 9/0515 439/578 |

FOREIGN PATENT DOCUMENTS

| | | | |
|---|---|---|---|
| CN | 103337740 | A | 10/2013 |
| CN | 103367979 | A | 10/2013 |
| JP | 2017-152196 | A | 8/2017 |

* cited by examiner

CONNECTOR DEVICE

CROSS REFERENCE TO RELATED APPLICATIONS

This application is a national phase of PCT application No. PCT/JP2021/026811, filed on 16 Jul. 2021, which claims priority from Japanese patent application No. 2020-133701, filed on 6 Aug. 2020, all of which are incorporated herein by reference.

BACKGROUND OF THE INVENTION

(1) Field of the Invention

The present disclosure relates to a connector device.

(2) Description of Related Art

Patent Document 1 discloses a structure for connecting a first connector and a second connector facing each other via an adapter. The adapter is supported in the first connector and can rock to be inclined with respect to a facing direction of the both connectors. The second connector is formed with a guide portion spreading into a flare shape. If the first and second connectors are connected while being shifted in position, the adapter rocks by bringing a tip part thereof into sliding contact with the guide portion and is connected to the second connector.

PRIOR ART DOCUMENT

Patent Document

Patent Document 1: US 2012/0295478 A1

SUMMARY OF THE INVENTION

If the first connector, the second connector and the adapter are arranged in such a posture that axes are horizontally oriented, there is a concern that the adapter is inclined obliquely downward by its own weight. As a countermeasure against this, it is considered to largely expand a width of the guide portion provided in the second connector. However, this enlarges a connector device as a whole.

A connector device of the present disclosure was completed on the basis of the above situation and aims for miniaturization.

The present disclosure is directed to a connector device with a first connector, a second connector provided to face the first connector, an adapter for connecting the first and second connectors, a resilient holding portion formed in the first connector, the resilient holding portion having a shape retention force capable of holding the adapter in a fixed posture with respect to the first connector, the resilient holding portion being resiliently deformable, and a guide portion for absorbing position shifts of the first and second connectors by inclining the adapter with respect to the first connector while resiliently deforming the resilient holding portion.

According to the present disclosure, miniaturization can be achieved.

DETAILED DESCRIPTION OF THE INVENTION

Description of Embodiments of Present Disclosure

Figure 1:
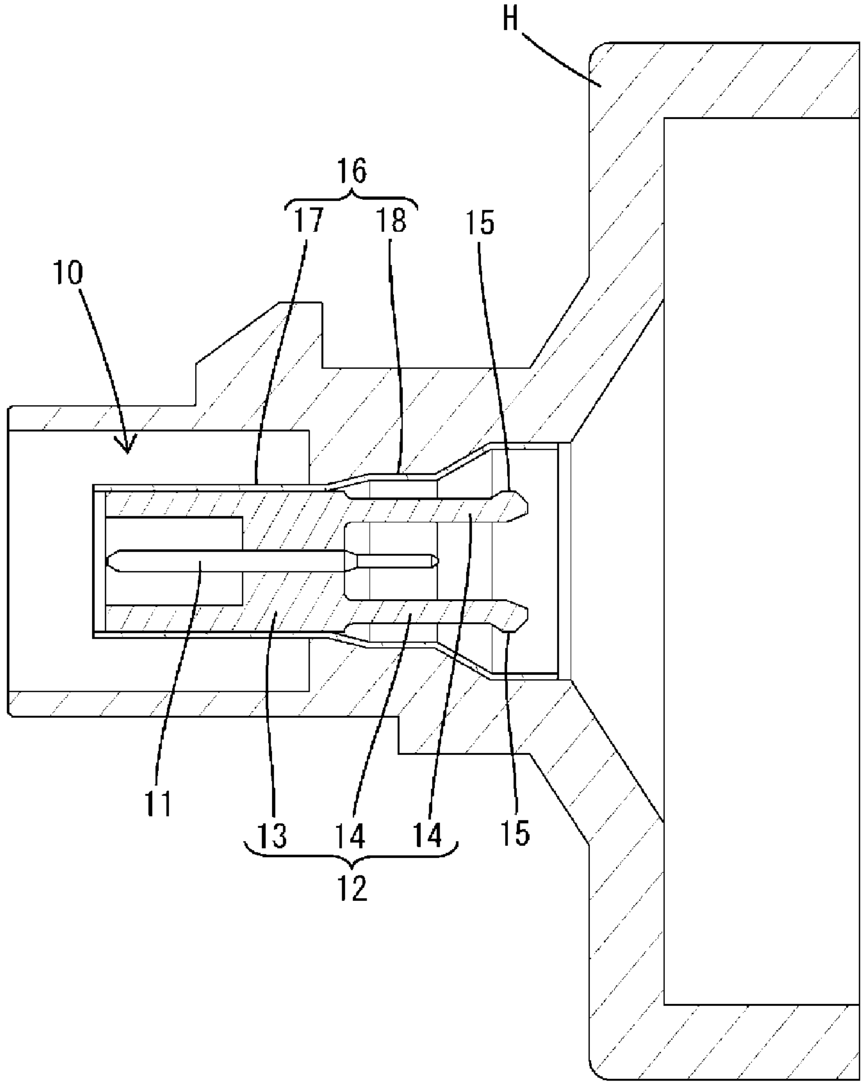
FIG. 1 is a side view in section of a first connector constituting a connector device of one embodiment.

First, embodiments of the present disclosure are listed and described.

(1) The connector device of the present disclosure is provided with a first connector, a second connector provided to face the first connector, an adapter for connecting the first and second connectors, a resilient holding portion formed in the first connector, the resilient holding portion having a shape retention force capable of holding the adapter in a fixed posture with respect to the first connector, the resilient holding portion being resiliently deformable, and a guide portion for absorbing position shifts of the first and second connectors by inclining the adapter with respect to the first connector while resiliently deforming the resilient holding portion. According to the configuration of the present disclosure, the adapter can be held in a fixed posture by the shape retention force of the resilient holding portion. In this way, the inclination of the adapter with respect to the first connector needs not be considered in setting a guide area by the guide portion. Since it is sufficient to suppress the guide area of the guide portion to minimum dimensions necessary to absorb the position shifts of the first and second connectors, the connector device can be reduced in size in a rocking direction of the adapter.

(2) Preferably, the resilient holding portion is integrally formed to a first dielectric constituting the first connector. According to this configuration, the number of components can be reduced as compared to the case where the resilient holding portion is formed in a dedicated component separate from the first dielectric.

(3) Preferably, the adapter is held in the fixed posture with respect to the first connector by a movable outer conductor constituting the adapter resiliently coming into contact with the resilient holding portion. According to this configuration, since the posture of the adapter can be held using the movable outer conductor, the number of components can be reduced as compared to the case where a dedicated component separate from the movable outer conductor is brought into contact with the resilient holding portion.

(4) Preferably, in (3), the movable outer conductor is formed with a holding contact portion for coming into contact with the resilient holding portion, and a contact point portion separated from the holding contact portion in a facing direction of the first and second connectors, the contact point portion resiliently coming into contact with a first dielectric constituting the first connector. According to this configuration, since the holding contact portion and the contact point portion of the movable outer conductor come into contact with the first connector at two positions spaced apart in the facing direction of the first and second connectors, the adapter can be reliably held in the fixed posture.

(5) Preferably, in (4), the holding contact portion is formed by recessing an inner peripheral surface of the movable outer conductor, and a projection for coming into contact with the holding contact portion is formed on an outer surface of the resilient holding portion. According to this configuration, since the projection and the holding contact portion also have a function of holding the adapter in a state retained in the first connector, the shapes of the resilient holding portion and the movable outer conductor can be simplified as compared to the case where a dedicated retaining portion is formed separately from the projection and the resilient holding portion.

(6) Preferably, in (5), a pair of the resilient holding portions are arranged vertically apart from each other, and the adapter is rockable in a horizontal direction with a pair of the projections as a fulcrum. According to this configuration, even if the first and second connectors are shifted in position in the horizontal direction, position shifts of the first and second connectors in the horizontal direction can be absorbed by the inclination of the adapter in the horizontal direction with the projections of the resilient holding portions as a fulcrum.

(7) Preferably, an accommodation recess for accommodating the resilient holding portion is formed in an outer periphery of a movable dielectric constituting the adapter. According to this configuration, an outer diameter of the adapter needs not be increased.

DETAILS OF EMBODIMENT OF PRESENT DISCLOSURE

Embodiment 1

A specific embodiment of a connector device of the present disclosure is described below with reference to FIGS. 1 to 15. Note that the present invention is not limited to these illustrations, but is represented by claims and intended to include all changes in the scope of claims and in the meaning and scope of equivalents. A connector device of this embodiment is provided with a first connector 10, an adapter 20 and a second connector 40. In this embodiment, a right side in FIGS. 1, 2, 4, 5, 8, 9 and 12 to 15 is defined as a front side concerning front-rear directions of the first connector 10 and the adapter 20. A left side in FIGS. 11 to 15 is defined as a front side concerning a front-rear direction of the second connector 40.

(First Connector 10)

Figure 2:
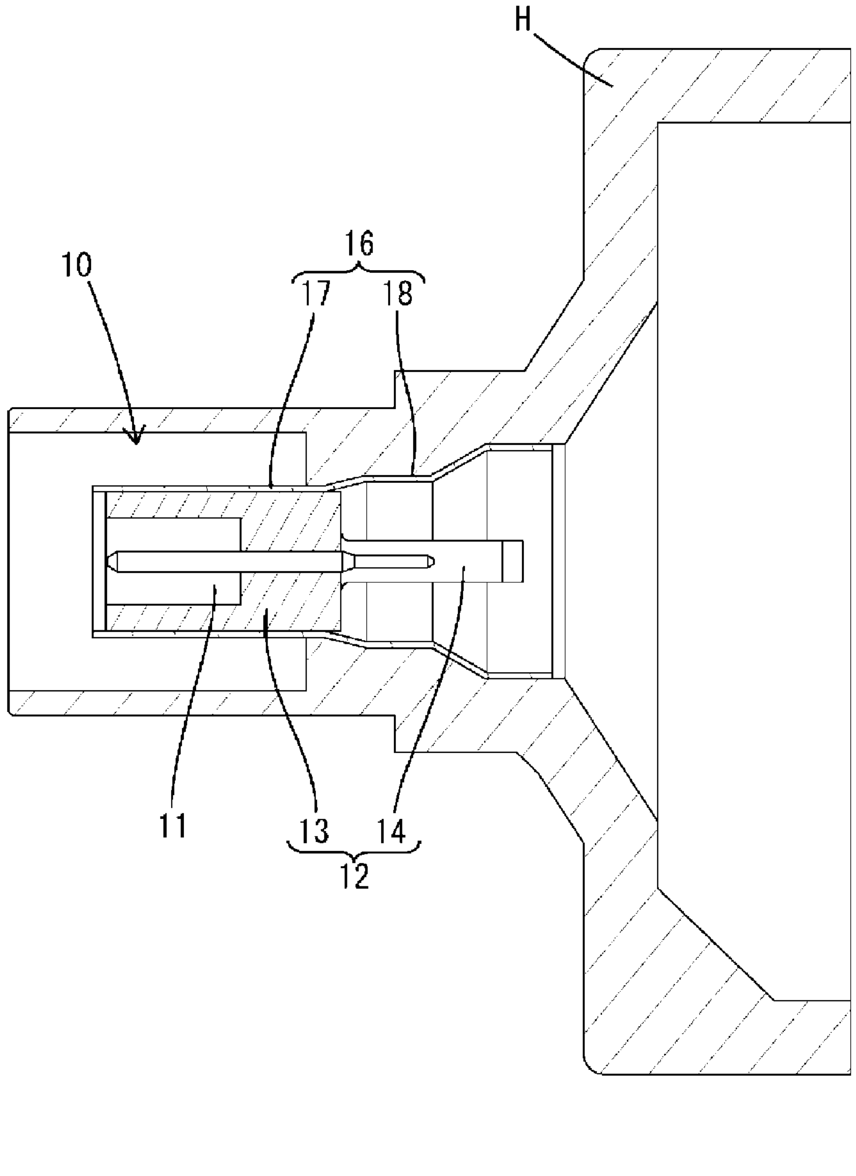
FIG. 2 is a plan view in section of the first connector.
Figure 3:
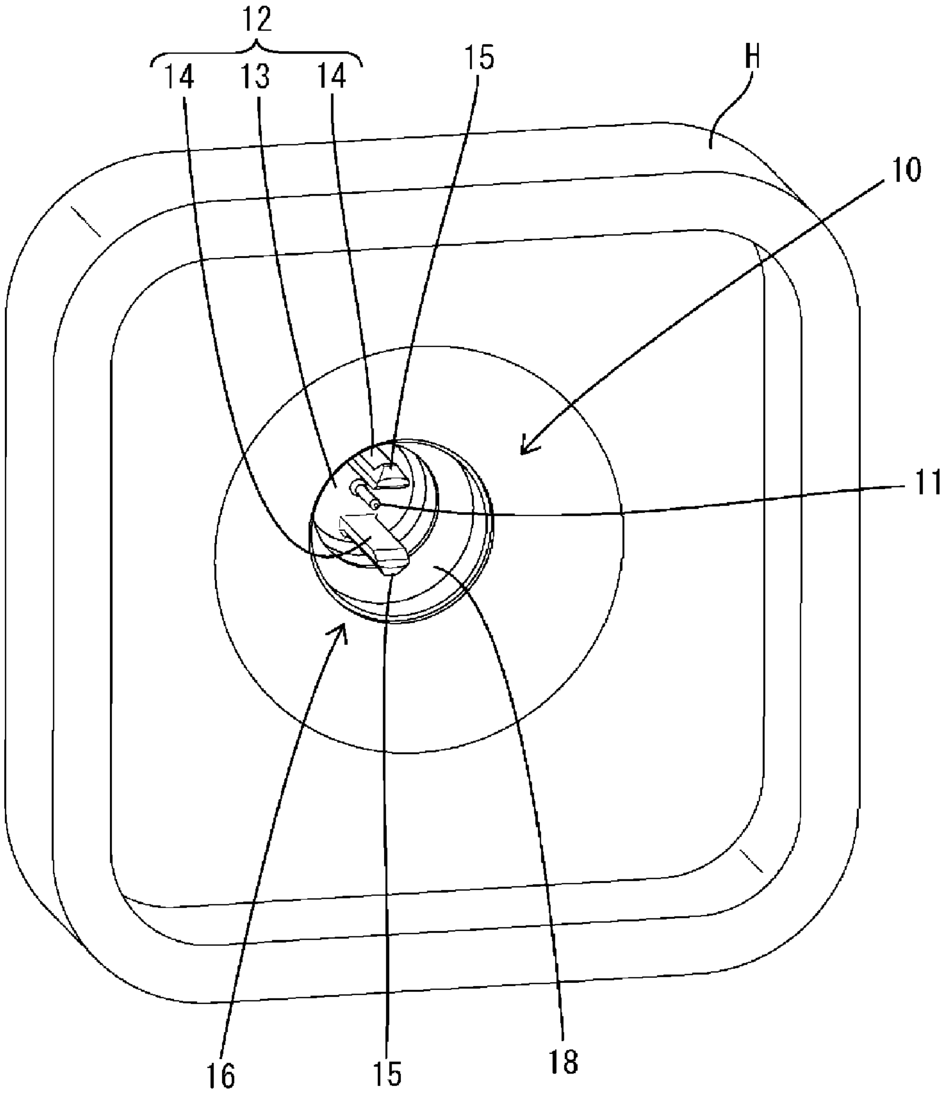
FIG. 3 is a perspective view of the first connector.

As shown in FIGS. 1 and 2, the first connector 10 is connected, for example, to an in-vehicle camera (not shown) while being accommodated in a housing H. The first connector 10 includes a first inner conductor 11 having an axis oriented in the front-rear direction, a tubular first dielectric 12 having an axis oriented in the front-rear direction and a hollow cylindrical first outer conductor 16 having an axis oriented in the front-rear direction.

Figure 13:
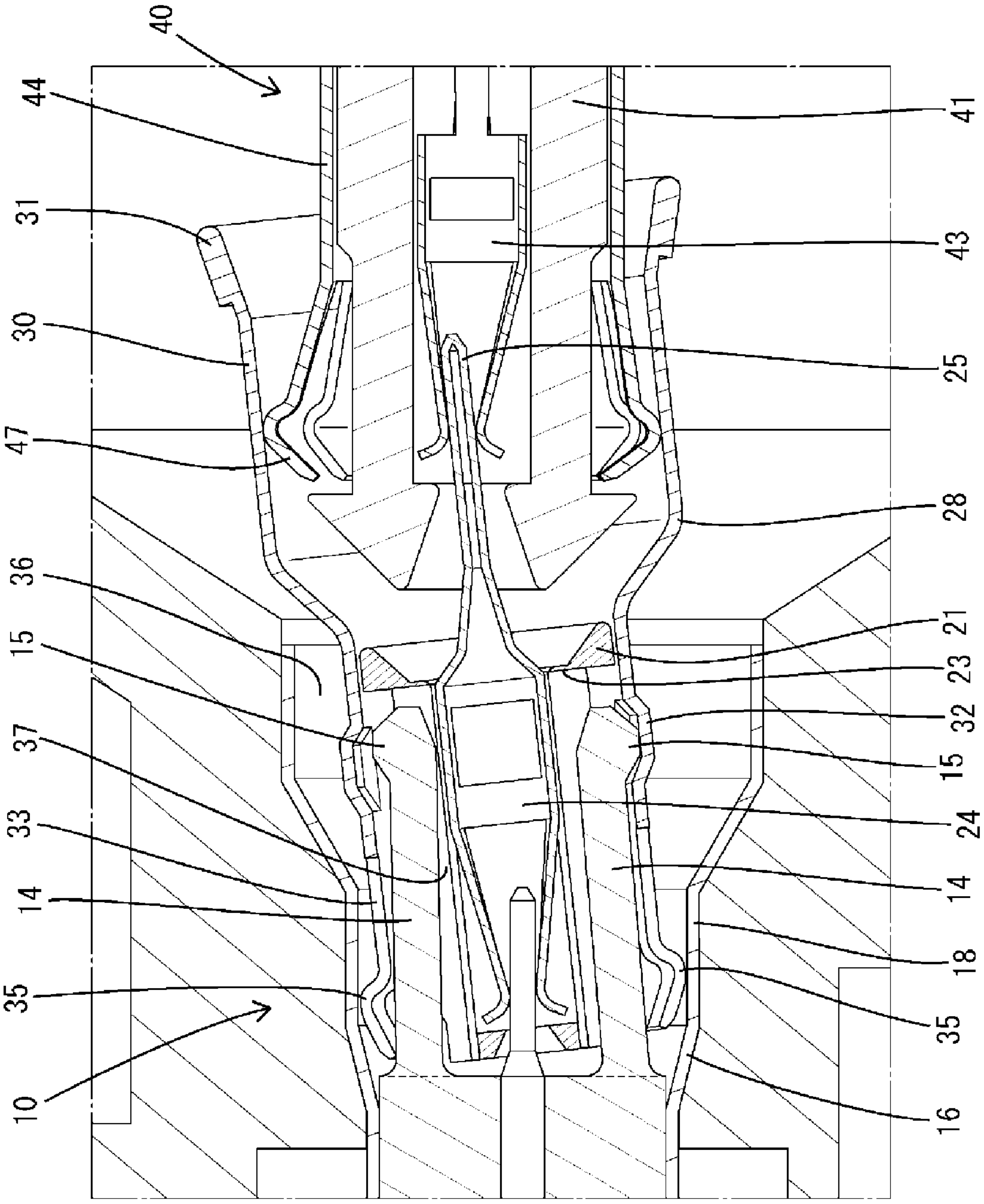
FIG. 13 is a side view in section showing a state where the first and second connectors are vertically shifted in position and the adapter is connected to the second connector.

The first dielectric 12 is a single component including a dielectric body portion 13 for coaxially holding the first inner conductor 11 and a pair of upper and lower resilient holding portions 14 cantilevered forward from the front end surface of the dielectric body portion 13. The resilient holding portion 14 has a shape retention property (rigidity) enabling the adapter 20 to be kept in a fixed posture when the adapter 20 is not receiving an external load. The resilient holding portion 14 can be resiliently deformed when the adapter 20 receives an external load. As shown in FIG. 13, the resilient holding portion 14 can be resiliently deformed to rock such that a side view posture is facing obliquely upward or downward with a rear end part (part connected to the dielectric body portion 13) of the resilient holding portion 14 as a fulcrum. A front end part of the upper resilient holding portion 14 is formed with a projection 15 projecting upward (toward an outer surface side of the resilient holding portion 14). A front end part of the lower resilient holding portion 14 is formed with a projection 15 projecting downward (toward an outer surface side of the resilient holding portion 14).

The first outer conductor 16 is a single component including a hollow cylindrical dielectric holding portion 17 fit to the outer periphery of the dielectric body portion 13 and a hollow cylindrical enlarged diameter portion 18 projecting forward from the front end of the dielectric holding portion 17. The enlarged diameter portion 18 is shaped to be enlarged in diameter in a stepwise manner toward a front side. The first outer conductor 16 is mounted on the first dielectric 12 with the dielectric holding portion 17 coaxially fit to the outer periphery of the first dielectric 12. The enlarged diameter portion 18 surrounds the pair of resilient holding portions 14 with gaps formed therebetween in a vertical direction.

(Adapter 20)

Figure 4:
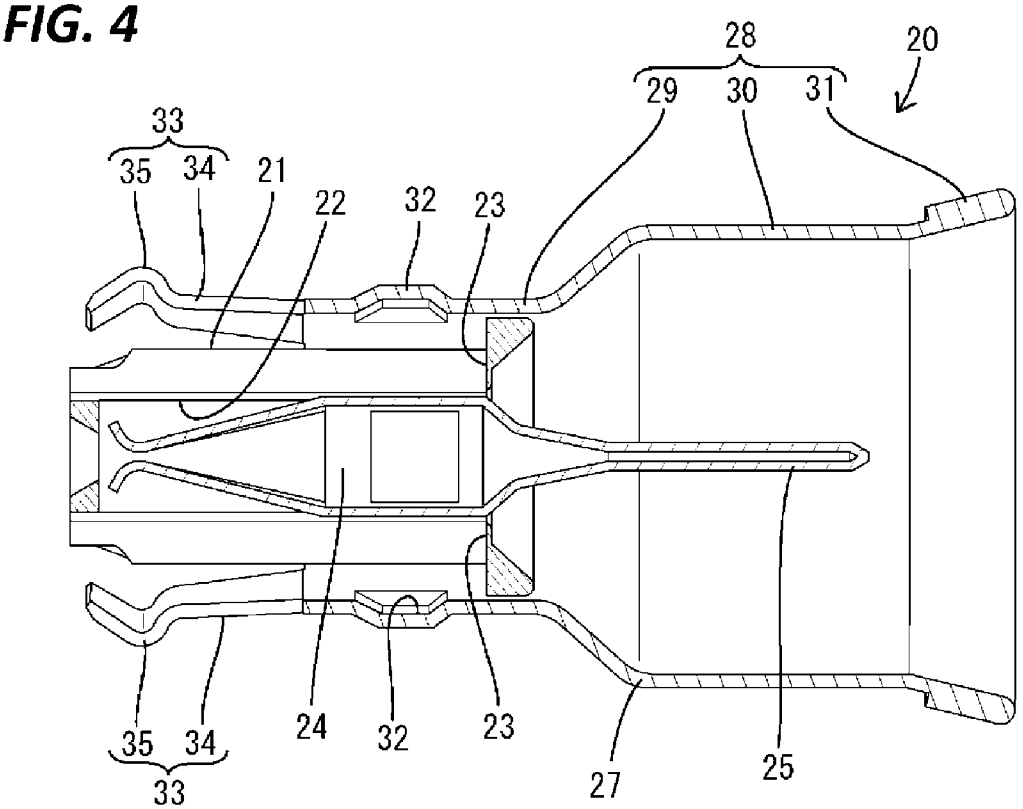
FIG. 4 is a side view in section of an adapter.
Figure 5:
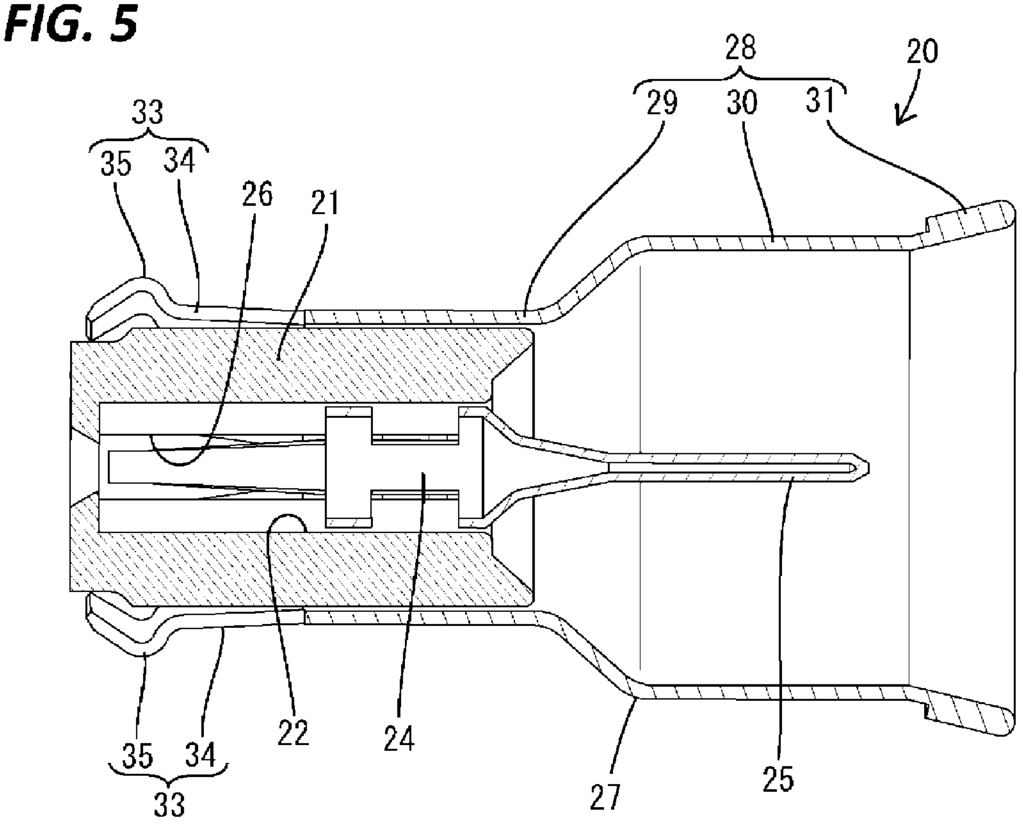
FIG. 5 is a plan view in section of the adapter.
Figure 6:
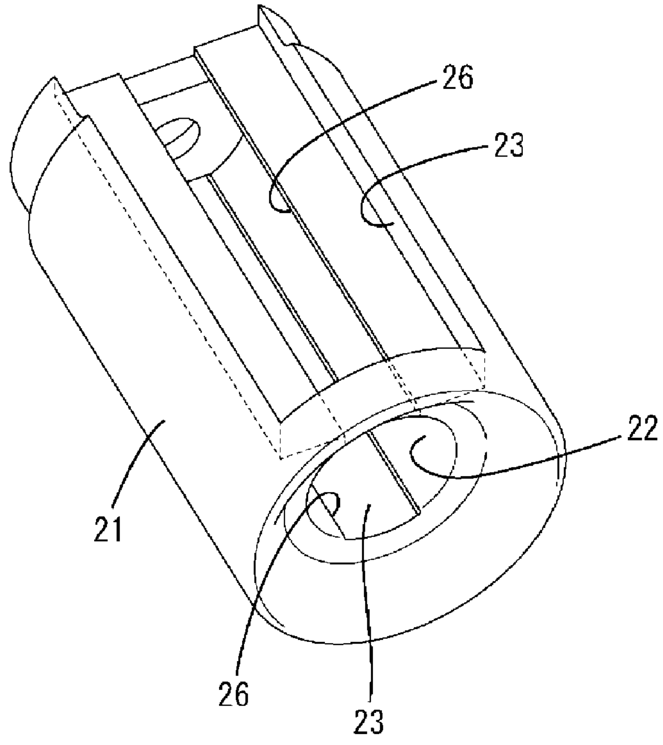
FIG. 6 is a perspective view of a movable dielectric of the adapter.

As shown in FIGS. 4 and 5, the adapter 20 includes a tubular movable dielectric 21, an elongated movable inner conductor 24 and a movable outer conductor 27. The movable dielectric 21 is formed with an inner conductor accommodation chamber 22 penetrating through the movable dielectric 21 in an axial direction. An inner diameter of the inner conductor accommodation chamber 22 is smaller than an interval between the inner surfaces of the pair of upper and lower resilient holding portions 14. As shown in FIGS. 4 and 6, the movable dielectric 21 is formed with a pair of upper and lower accommodation recesses 23 extending in the axial direction. The accommodation recess 23 is widely open in the outer peripheral surface of the movable dielectric 21 and also open in the rear end surface of the movable dielectric 21. The accommodation recess 23 communicates with the inner conductor accommodation chamber 22 via a communication hole 26 narrower than a width of the accommodation recess 23. A width of the accommodation recess 23 in a circumferential direction is larger than that of the resilient holding portion 14 in the circumferential direction. The movable inner conductor 24 is mounted in the movable dielectric 21. With the movable inner conductor 24 mounted in the movable dielectric 21, a tab 25 of the movable inner conductor 24 projects forward from the front end of the movable dielectric 21. An entire region of the movable inner conductor 24 behind the tab 25 is accommodated in the inner conductor accommodation chamber 22.

Figure 7:
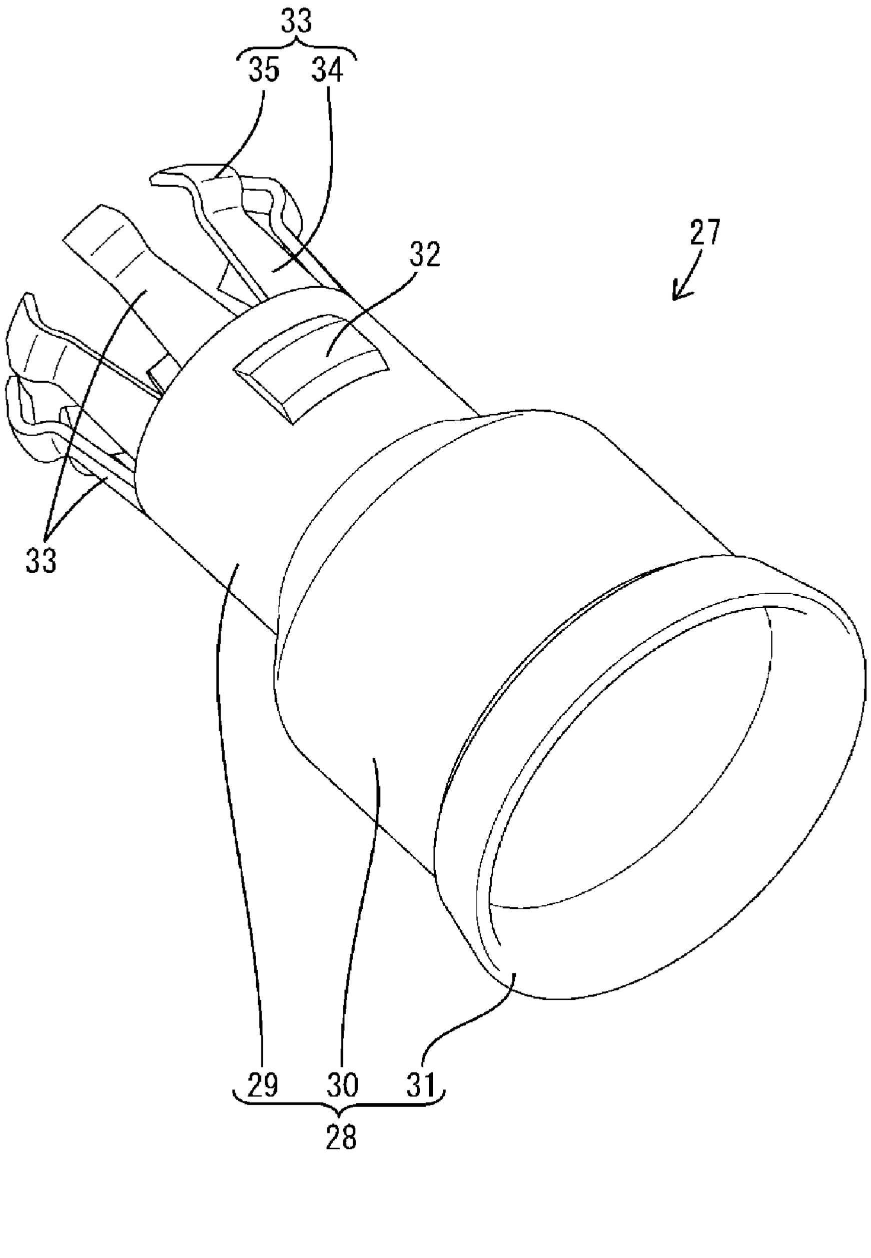
FIG. 7 is a perspective view of a movable outer conductor.

As shown in FIGS. 4, 5 and 7, the movable outer conductor 27 is a single component including a hollow cylindrical outer conductor body portion 28 and a plurality of resilient contact pieces 33 spaced apart in the circumferential direction. The outer conductor body portion 28 includes a small diameter portion 29, a large diameter portion 30 and a guided portion 31. The small diameter portion 29 is formed in a rear end part of the outer conductor body portion 28. The small diameter portion 29 is formed with a pair of upper and lower holding contact portions 32. The holding contact portion 32 is shaped by causing a part of the small diameter portion 29 to partially bulge radially outward (upward or downward) and recessing a part of the inner peripheral surface of the movable outer conductor 27.

The large diameter portion 30 has a larger diameter than the small diameter portion 29 and projects forward from the front end of the small diameter portion 29. The large diameter portion 30 is located forward of the front end of the movable dielectric 21 and surrounds the tab 25 of the movable inner conductor 24. The guided portion 31 is formed in a front end part of the large diameter portion 30 and located in a front end part of the movable outer conductor 27. The guided portion 31 has a tapered hollow cylindrical shape enlarged in diameter toward the front side.

The plurality of resilient contact pieces 33 are arranged at equal angular intervals in the circumferential direction and cantilevered rearward from the rear end edge of the small diameter portion 29. The resilient contact piece 33 includes a base portion 34 extending rearward in parallel to an axis of the movable outer conductor 27 and a contact point portion 35 connected to the rear end of the base portion 34. The contact point portion 35 is arranged in a rear end part (extending end part) of the resilient contact piece 33. The contact point portion 35 is arranged at a position radially outward of the base portion 34. The movable outer conductor 27 is coaxially mounted on the movable dielectric 21 while surrounding the movable dielectric 21 by the small diameter portion 29 and the resilient contact pieces 33.

Figure 8:
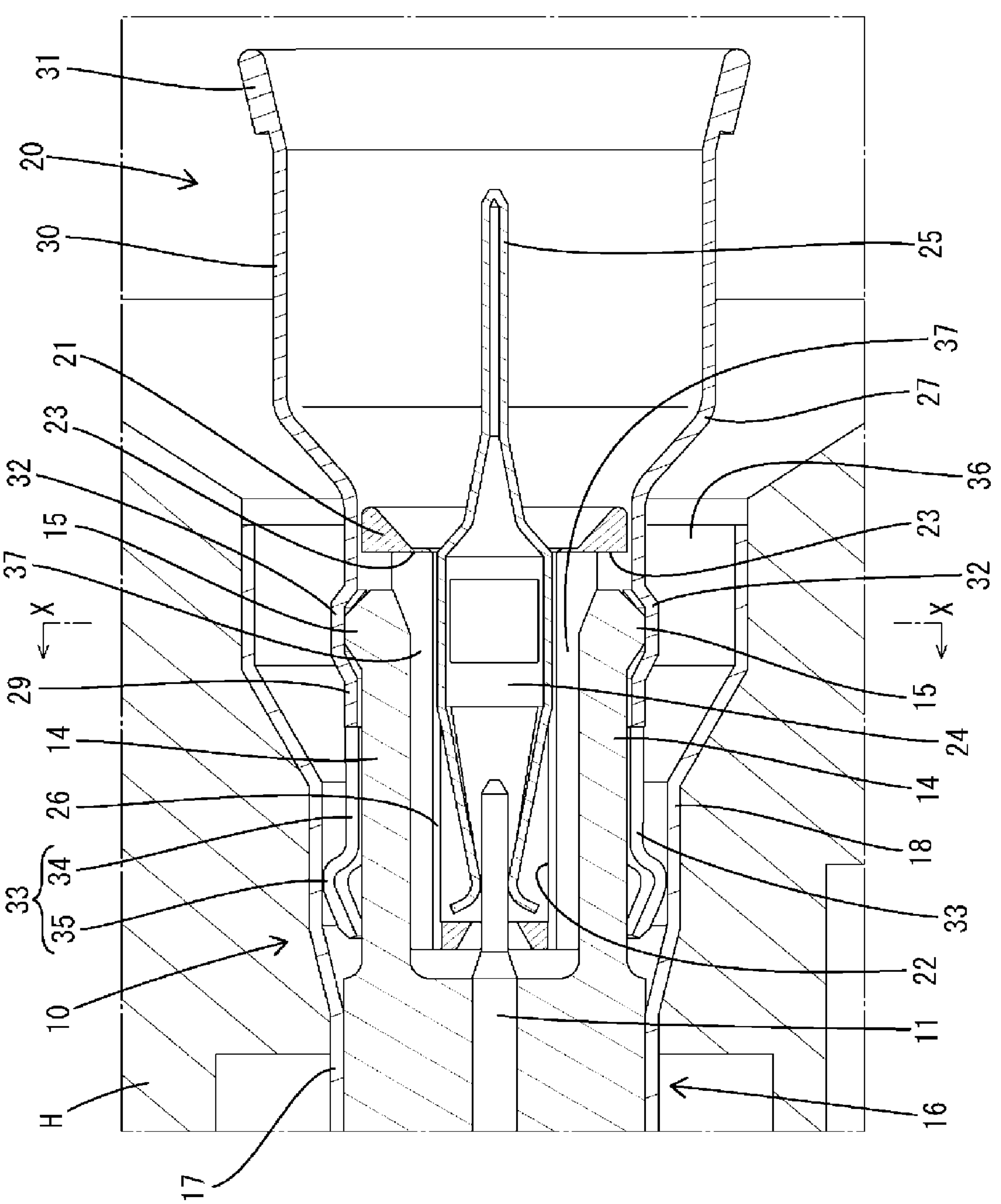
FIG. 8 is a side view in section showing a state where the adapter is held in the first connector.
Figure 9:
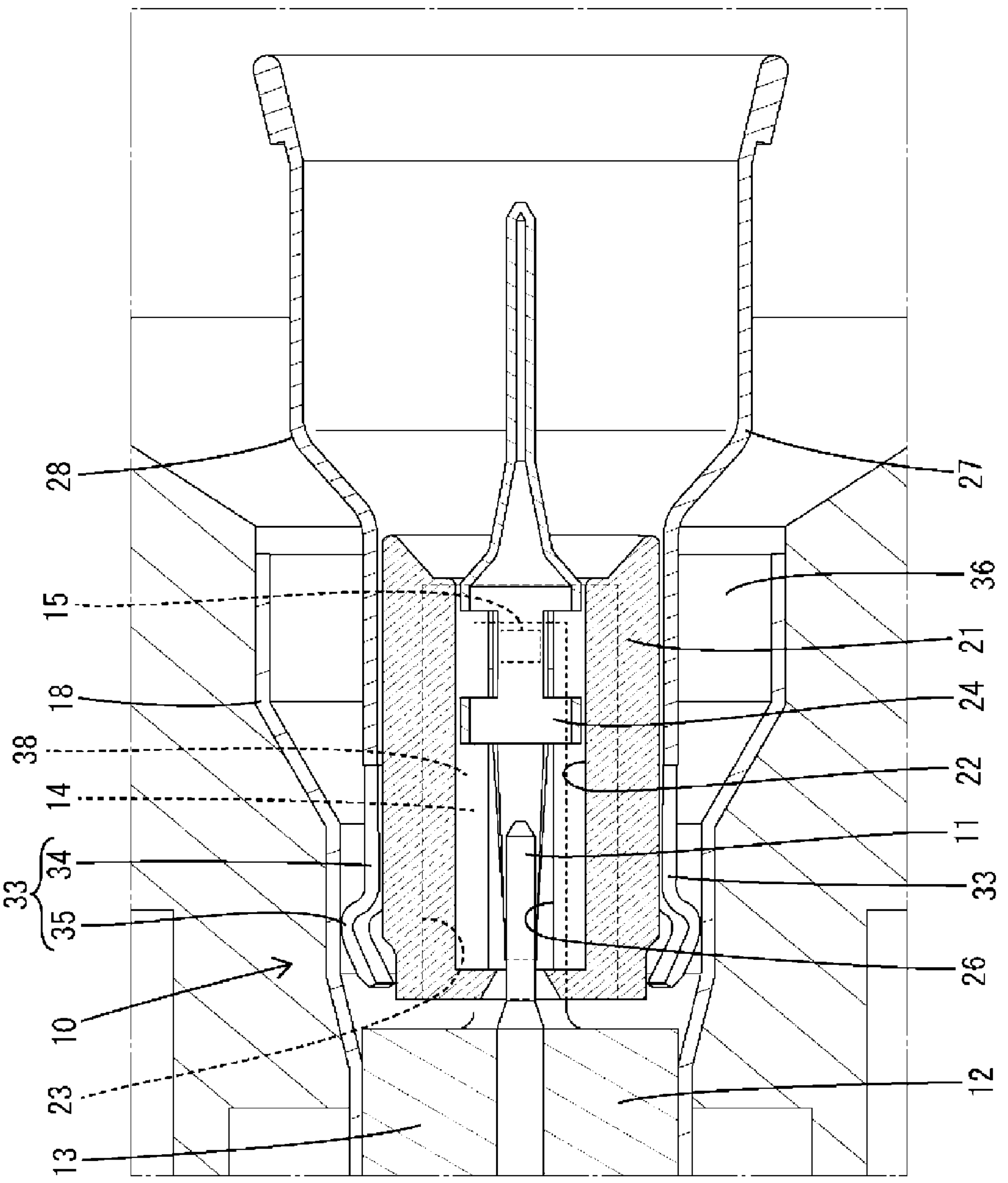
FIG. 9 is a plan view in section showing the state where the adapter is held in the first connector.
Figure 10:
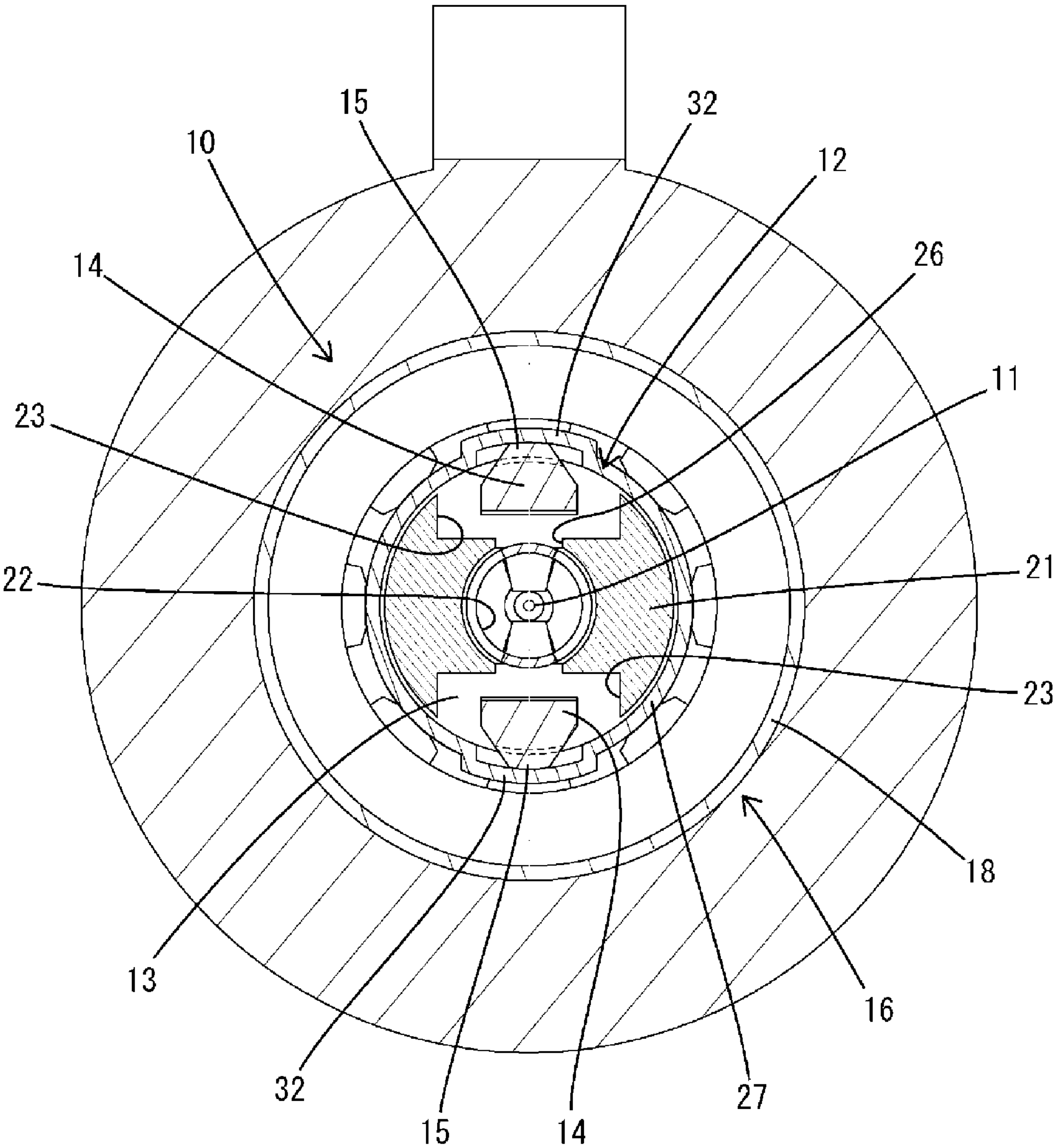
FIG. 10 is a section along X-X of FIG. 8.

As shown in FIGS. 8 and 9, the adapter 20 is mounted in the first connector 10. With the adapter 20 mounted in the first connector 10, the movable inner conductor 24 is connected to the first inner conductor 11, the pair of resilient holding portions 14 are individually accommodated in the pair of accommodation recesses 23 and the small diameter portion 29 and the resilient contact pieces 33 cover the outer surfaces of the resilient holding portions 14. With the adapter 20 mounted in the first connector 10, the projections 15 of the resilient holding portions 14 are fit in recessed parts on the inner peripheries of the holding contact portions 32 of the movable outer conductor 27. Thus, the adapter 20 is restricted from being relatively displaced in the axial direction with respect to the first connector 10.

With the adapter 20 mounted in the first connector 10, the contact point portions 35 of the plurality of resilient contact pieces 33 are resiliently in contact with the inner peripheral surface of the enlarged diameter portion 18 of the first outer conductor 16 from radially inner sides. A rear end part of the adapter 20 is held concentrically with respect to the first connector 10 by resilient forces of the resilient contact pieces 33. The pair of upper and lower projections 15 of the first connector 10 resiliently come into contact with the pair of upper and lower holding contact portions 32 of the movable outer conductor 27 from radially inner sides. A central part in the axial direction of the adapter 20 is held concentrically with respect to the first connector 10 by the rigidity (shape retention forces) of the resilient holding portions 14. Contact positions of the projections 15 and the holding contact portions 32 are separated from resilient contact positions of the contact point portions 35 and the first outer conductor 16 in the axial direction (forward of the first connector 10). In this way, the entire adapter 20 is held in a fixed horizontal posture, i.e. coaxially, with respect to the first connector 10 in a state where an external load such as a pressing force is not acting downward on the adapter 20.

A clearance 36 is secured in a radial direction over an entire periphery between a region forward of parts contacted by the contact point portions 35, out of the inner peripheral surface of the enlarged diameter portion 18 of the first outer conductor 16, and the outer peripheral surface of the adapter 20. Since an interval between the pair of resilient holding portions 14 is larger than the inner diameter of the inner conductor accommodation chamber 22 as shown in FIG. 8, displacement spaces 37 are secured in the radial direction (vertical direction) between the inner surfaces of the resilient holding portions 14 and the movable inner conductor 24. Since the width of the accommodation recess 23 is larger than that of the resilient holding portion 14 as shown in FIG. 9, a rocking space 38 enabling the resilient holding portion 14 to rock in the circumferential direction is secured in the accommodation recess 23.

(Second Connector 40)

Figure 11:
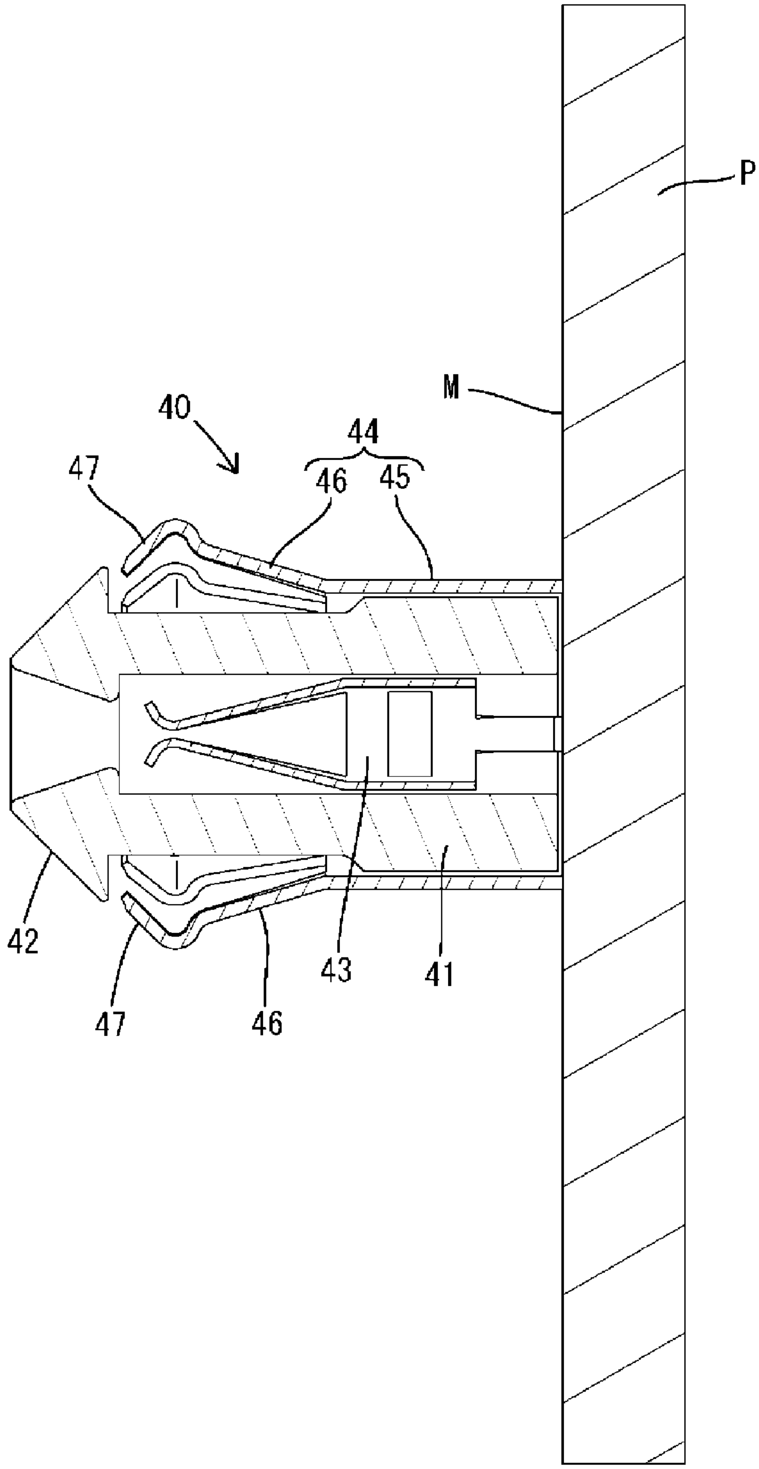
FIG. 11 is a side view in section of a second connector.

As shown in FIG. 11, the second connector 40 is fixedly mounted with an axis held perpendicular to a mounting surface M of a circuit board P, i.e. with the axis oriented in parallel to the first connector 10. The second connector 40 is provided with a hollow cylindrical second dielectric 41 having an axis oriented in the front-rear direction, a second inner conductor 43 coaxially mounted in the second dielectric 41 and a second outer conductor 44 coaxially mounted on the outer periphery of the second dielectric 41. A first guide portion 42 having a truncated conical shape and coaxial with the second dielectric 41 is formed in a front end part (tip part) of the second dielectric 41. A diameter of the first guide portion 42 is minimum in the front end of the first guide portion 42 and maximum in the rear end of the first guide portion 42.

The second outer conductor 44 surrounds a region of the second dielectric 41 behind (closer to the circuit board P) the first guide portion 42. The second outer conductor 44 includes a hollow cylindrical mounting portion 45 fixed to the mounting surface M and a plurality of resilient pieces 46 cantilevered forward from the front end edge of the mounting portion 45. The plurality of resilient pieces 46 are arranged at fixed intervals in a circumferential direction. A second guide portion 47 is formed in a front end part of the resilient piece 46. The second guide portion 47 is arranged obliquely behind the first guide portion 42 on an outer peripheral side of the first guide portion 42.

(Functions and Effects of Embodiment 1)

Figure 12:
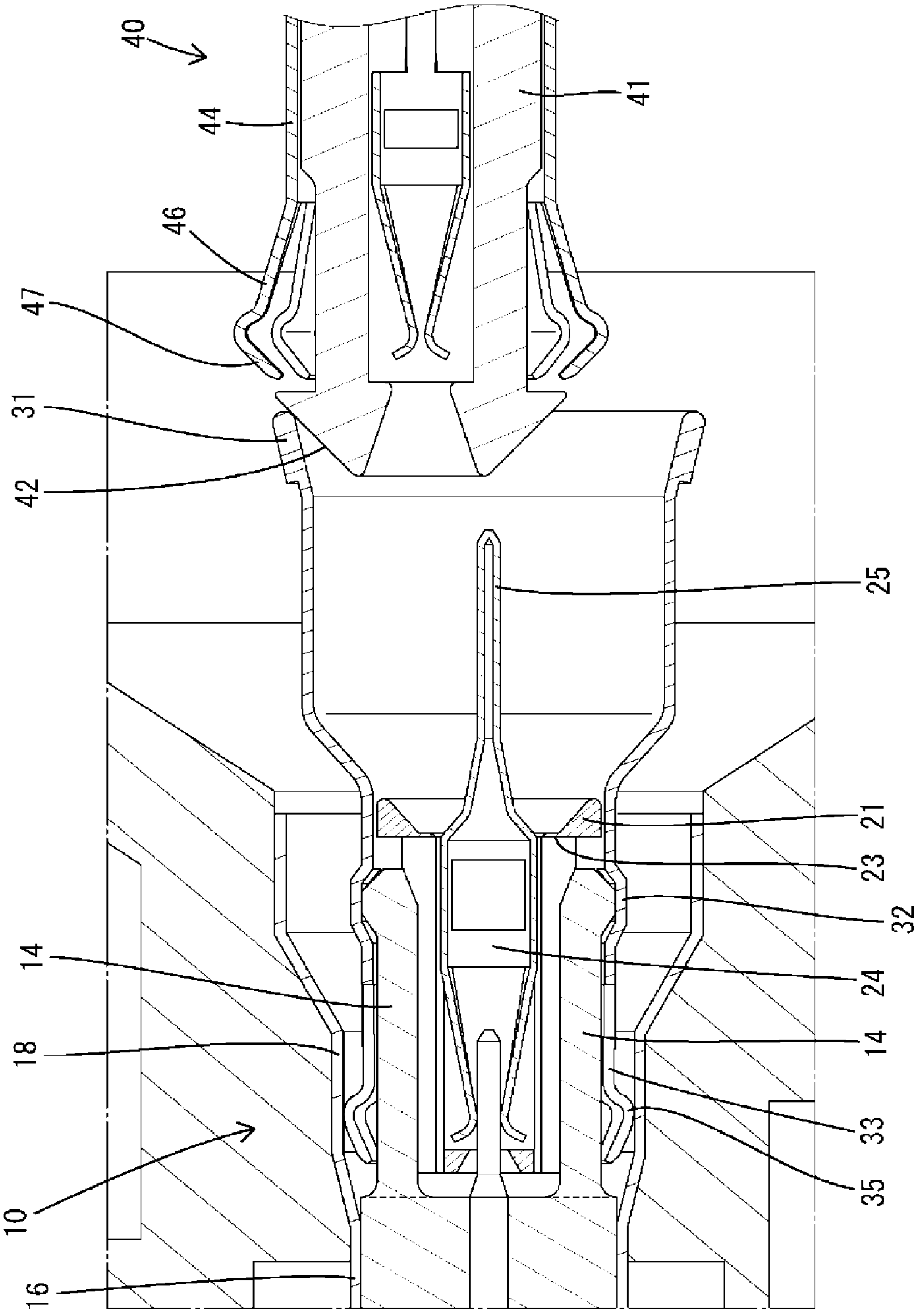
FIG. 12 is a side view in section showing a state where the first and second connectors are vertically shifted in position and the adapter is in contact with a guide portion of the second connector.

A process of connecting the first connector 10 and the second connector 40 with the second connector 40 positionally shifted relatively upward with respect to the first connector 10 is described. If the first and second connectors 10, 40 are brought closer while facing each other with the axes thereof held in parallel, an upper end part of the front end of the guided portion 31 comes into contact with an upper end part of the first guide portion 42 as shown in FIG. 12. At this time, the adapter 20 is held coaxially with the first connector 10.

If the first and second connectors 10, 40 are brought closer from this state, the guided portion 31 slides in contact with the first guide portion 42 and the adapter 20 is displaced obliquely upward to tilt the axis with respect to the first connector 10 by the inclination of the first guide portion 42.

At this time, since the lower holding contact portion 32 of the movable outer conductor 27 presses the projection 15 of the lower resilient holding portion 14, the lower resilient holding portion 14 is resiliently deformed to be inclined upward. The contact point portions 35 of the resilient contact pieces 33 are held in contact with the first outer conductor 16.

If the first and second connectors 10, 40 are brought even closer, the guided portion 31 rides onto the second guide portions 47 from the outer peripheral edge of the first guide portion 42 and the adapter 20 is further inclined by the inclination of the second guide portions 47. Since the clearance 36 is secured in the radial direction between the small diameter portion 29 of the movable outer conductor 27 and the enlarged diameter portion 18 of the first outer conductor 18, the movable outer conductor 27 does not interfere with the first outer conductor 16 and does not hinder a posture inclining movement of the adapter 20.

After the guided portion 31 passes through the second guide portions 47, the first and second connectors 10, 40 are further connected with the large diameter portion 30 of the adapter 20 held in sliding contact with the resilient pieces 46. During this time, the second inner conductor 43 and the tab 25 of the movable inner conductor 24 are connected and the first and second connectors 10, 40 are connected. By an oblique upward displacement of the adapter 20 in a side view as shown in FIG. 13, position shifts of the first and second connectors 10, 40 in the vertical direction are absorbed and the first and second connectors 10, 40 are properly connected.

Figure 14:
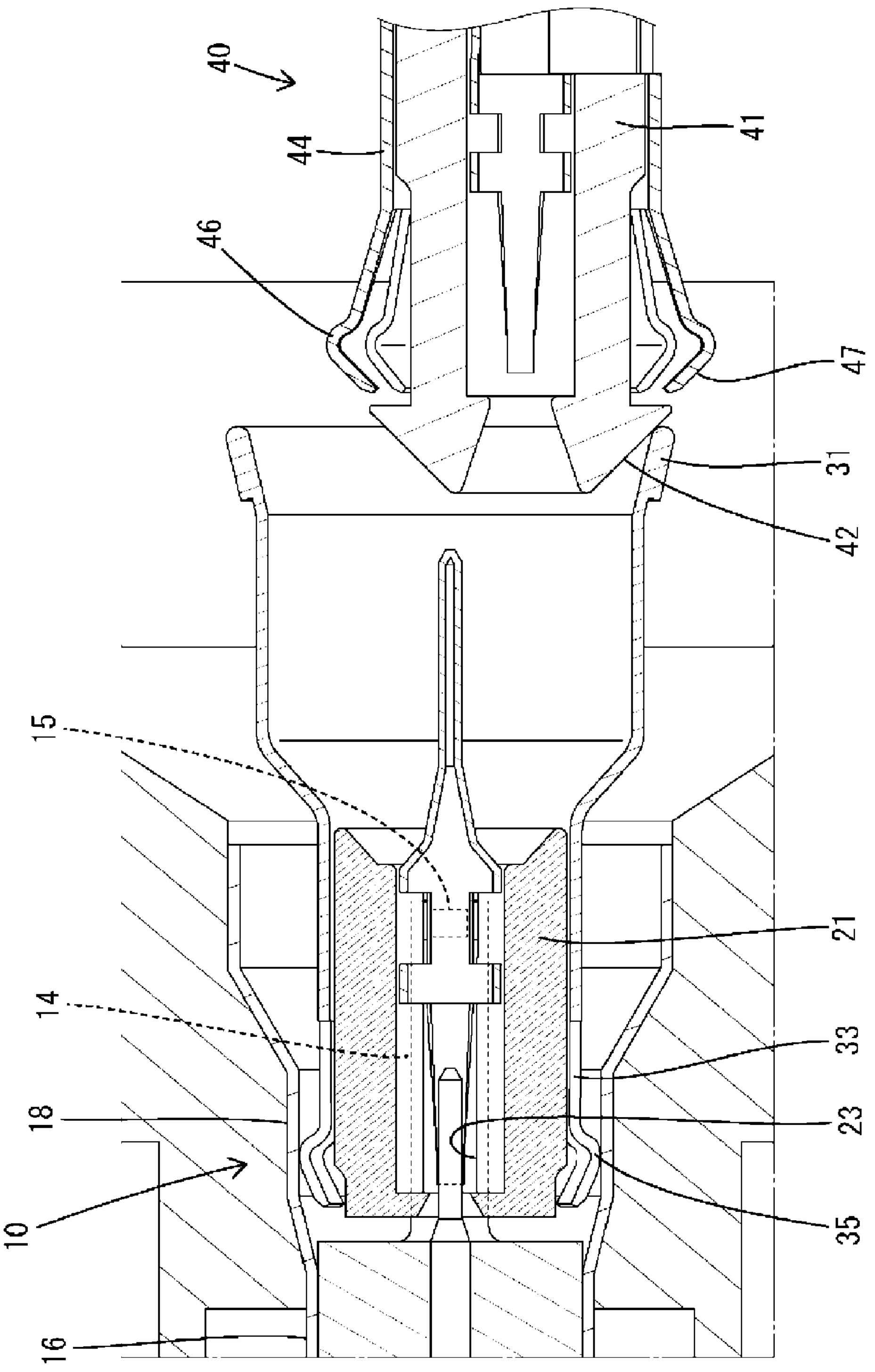
FIG. 14 is a side view in section showing a state where the first and second connectors are horizontally shifted in position and the adapter is in contact with the guide portion of the second connector.

Next, a process of connecting the first and second connectors 10, 40 with the second connector 40 positionally shifted relatively in the lateral direction (horizontal direction) with respect to the first connector 10 is described. If the first and second connectors 10, 40 are brought closer while facing each other with the axes thereof held in parallel, a side edge part of the front end of the guided portion 31 comes into contact with a side surface part of the first guide portion 42 as shown in FIG. 14. At this time, the adapter 20 is held coaxially with the first connector 10.

If the first and second connectors 10, 40 are brought even closer from this state, the guided portion 31 slides in contact with the first guide portion 42 and the adapter 20 is displaced obliquely laterally to tilt the axis with respect to the first connector 10 by the inclination of the first guide portion 42. A fulcrum of inclination of the adapter 20 is the projections 15 of the both upper and lower resilient holding portions 14. Therefore, the resilient holding portions 14 are not resiliently deformed.

If the first and second connectors 10, 40 are brought even closer, the guided portion 31 rides onto the second guide portions 47 from the outer peripheral edge of the first guide portion 42 and the adapter 20 is further inclined by the inclination of the second guide portions 47. Since the clearance 36 is secured in the radial direction between the small diameter portion 29 of the movable outer conductor 27 and the enlarged diameter portion 18 of the first outer conductor 18, a posture inclining movement of the adapter 20 is not hindered.

Figure 15:
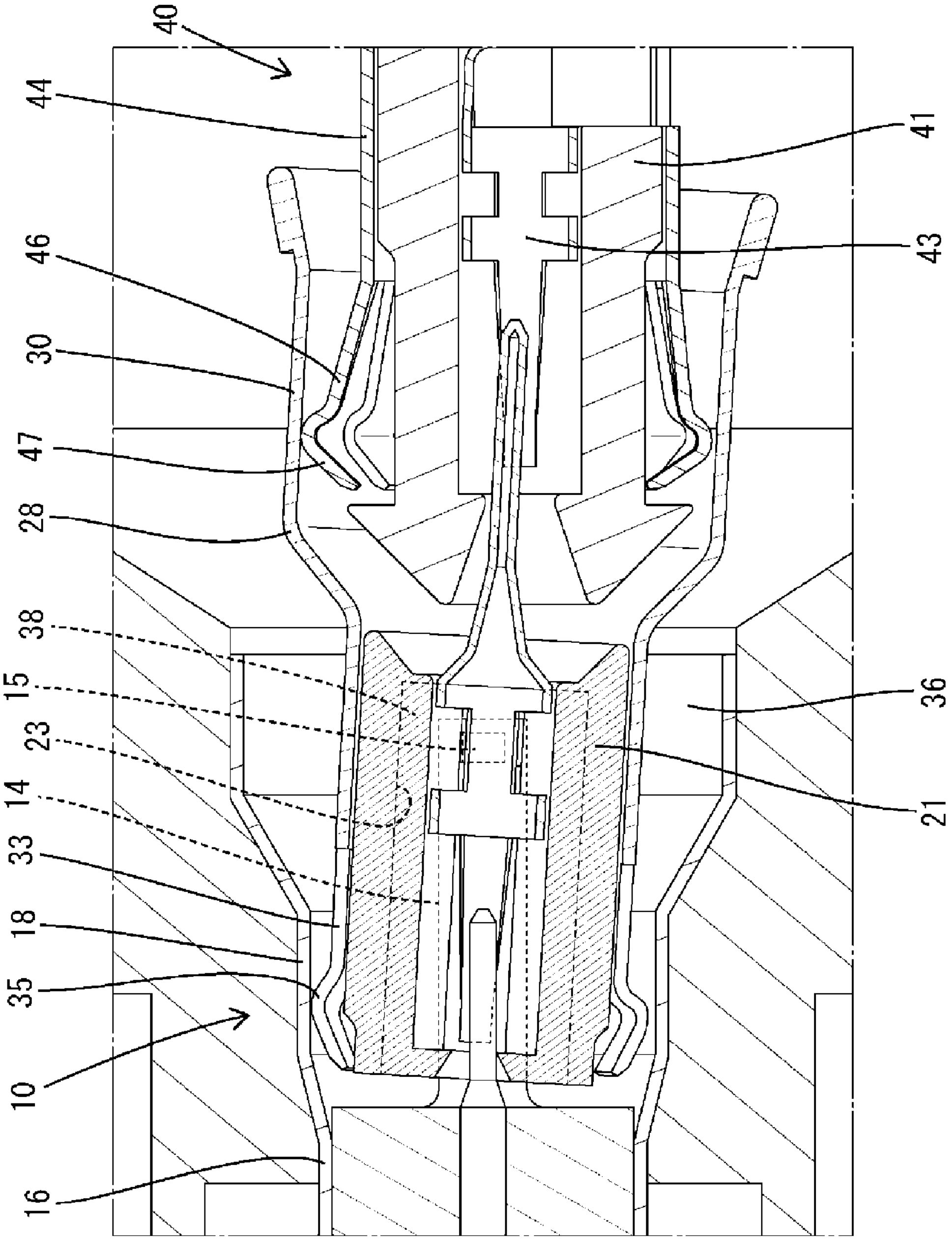
FIG. 15 is a plan view in section showing the state where the first and second connectors are horizontally shifted in position and the adapter is connected to the second connector.

After the guided portion 31 passes through the second guide portions 47, the first and second connectors 10, 40 are further connected with the large diameter portion 30 of the adapter 20 held in sliding contact with the resilient pieces 46. During this time, the second inner conductor 43 and the movable inner conductor 24 are connected and the first and second connectors 10, 40 are connected. By an oblique lateral displacement of the adapter 20 in a plan view as shown in FIG. 15, position shifts of the first and second connectors 10, 40 in the horizontal direction are absorbed and the first and second connectors 10, 40 are properly connected.

If the first and second connectors 10, 40 are shifted in position in both the vertical direction and horizontal direction, a movement of the adapter 20 to incline the posture in the vertical direction while resiliently deforming the resilient holding portions 14 and a movement of the adapter 20 to incline the posture in the horizontal direction with the projections 15 as a fulcrum are made in a complex manner. Since position shifts of the first and second guide portions 42, 47 are absorbed by such complex movements of the adapter 20, the first and second connectors 10, 40 are properly connected.

The connector device of this embodiment is provided with the first connector 10, the second connector 40 provided to face the first connector 10 and the adapter 20 for connecting the first and second connectors 10, 40. The first connector 10 is formed with the resilient holding portions 14 having the shape retention property capable of holding the adapter 20 not receiving an external load in a fixed posture (coaxial posture) with respect to the first connector 10 and capable of being resiliently deformed when an external load is applied to the adapter 20. The second connector 40 is provided with the first guide portion 42 and the second guide portions 47. The first and second guide portions 42, 47 absorb the position shifts of the first and second connectors 10, 40 by inclining the adapter 20 with respect to the first connector 10 while resiliently deforming the resilient holding portions 14.

According to the connector device of this embodiment, since the adapter 20 can be held in the fixed posture by shape retention forces of the resilient holding portions 14, the inclination of the adapter 20 with respect to the first connector 10 needs not be considered in setting guide areas by the first and second guide portions 42, 47. It is sufficient to suppress the guide areas of the first and second guide portions 42, 47 to minimum dimensions necessary to absorb the position shifts of the first and second connectors 10, 40. Therefore, the connector device of this embodiment can be reduced in size in a rocking direction of the adapter 20.

The resilient holding portions 14 are integrally formed to the first dielectric 12 constituting the first connector 10. According to this configuration, the number of components can be reduced as compared to the case where the resilient holding portions 14 are formed in a dedicated component separate from the first dielectric 12.

The holding contact portions 32 of the movable outer conductor 27 constituting the adapter 20 resiliently come into contact with the projections 15 of the resilient holding portions 14, whereby the adapter 20 is held in the fixed (coaxial) posture with respect to the first connector 10. According to this configuration, since the posture of the adapter 20 can be held using the movable outer conductor 27, the number of components can be reduced as compared to the case where a dedicated component separate from the movable outer conductor 27 is brought into contact with the resilient holding portions 14.

The movable outer conductor 27 is formed with the holding contact portions 32 for coming into contact with the projections 15 of the resilient holding portions 14 and the contact point portions 35 for resiliently coming into contact with the first outer conductor 16. The holding contact portions 32 and the contact point portions 35 are positioned to be separated in the facing direction of the first and second connectors 10, 40 (axial direction of the both connectors 10, 40). Since the holding contact portions 32 and the contact point portions 35 of the movable outer conductor 27 come into contact with the first connector 10 at two positions spaced apart in the facing direction of the first and second connectors 10, 40, the adapter 20 can be reliably held in the fixed (coaxial) posture.

The holding contact portions 32 are formed by recessing the inner peripheral surface of the movable outer conductor 27. The projections 15 for coming into contact with the holding contact portions 32 are formed on the outer surfaces of the resilient holding portions 14. The projections 15 and the holding contact portions 32 also have a function of holding the adapter 20 in a state retained in the first connector 10. Therefore, the shapes of the resilient holding portions 14 and the movable outer conductor 27 can be simplified as compared to the case where a dedicated retaining portion is formed separately from the projections 15 and the holding contact portions 32.

The pair of resilient holding portions 14 are arranged apart from each other in the vertical direction. The adapter 20 is rockable in the horizontal direction with the pair of projections 15 as a fulcrum. According to this configuration, even if the first and second connectors 10, 40 are shifted in position in the horizontal direction, the adapter 20 is inclined in the horizontal direction with the projections 15 of the resilient holding portions 14 as a fulcrum, whereby the position shifts of the first and second connectors 10, 40 in the horizontal direction can be absorbed.

The accommodation recesses 23 for accommodating the resilient holding portions 14 are formed in the outer periphery of the movable dielectric 21 constituting the adapter 20. According to this configuration, an outer diameter of the adapter 20 needs not be increased.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although the resilient holding portions are integrally formed to the first dielectric in the above embodiment, the resilient holding portions may be integrally formed to a dedicated component separate from the first dielectric.

Although the inner peripheral surface of the movable outer conductor is brought into contact with the outer peripheral surfaces of the resilient holding portions in the above embodiment, the outer peripheral surface of the movable outer conductor may be brought into contact with the resilient holding portions.

Although the posture of the adapter is held by bringing the movable outer conductor of the adapter into contact with the resilient holding portions in the above embodiment, the movable dielectric of the adapter may be brought into contact with the resilient holding portions or a dedicated component separate from the movable outer conductor and the movable dielectric may be brought into contact with the resilient holding portions.

Although the resilient holding portions are accommodated in the accommodation recesses of the movable dielectric in the above embodiment, the resilient holding portions may be arranged outside the movable dielectric.

Although the resilient holding portions are arranged inside the movable outer conductor in the above embodiment, the resilient holding portions may be arranged outside the movable outer conductor.

LIST OF REFERENCE NUMERALS

H . . . housing
M . . . mounting surface
P . . . circuit board
10 . . . first connector
11 . . . first inner conductor
12 . . . first dielectric
13 . . . dielectric body portion
14 . . . resilient holding portion
15 . . . projection
16 . . . first outer conductor
17 . . . dielectric holding portion
18 . . . enlarged diameter portion
20 . . . adapter
21 . . . movable dielectric
22 . . . inner conductor accommodation chamber
23 . . . accommodation recess
24 . . . movable inner conductor
25 . . . tab
26 . . . communication hole
27 . . . movable outer conductor
28 . . . outer conductor body portion
29 . . . small diameter portion
30 . . . large diameter portion
31 . . . guided portion
32 . . . holding contact portion
33 . . . resilient contact piece
34 . . . base portion
35 . . . contact point portion
36 . . . clearance
37 . . . displacement space
38 . . . rocking space
40 . . . second connector
41 . . . second dielectric
42 . . . first guide portion
43 . . . second inner conductor
44 . . . second outer conductor
45 . . . mounting portion
46 . . . resilient piece
47 . . . second guide portion

What is claimed is:

1. A connector device, comprising:
a first connector;
a second connector provided to face the first connector;
an adapter for connecting the first and second connectors;
a resilient holding portion formed in the first connector, the resilient holding portion having a shape retention force capable of holding the adapter in a fixed posture with respect to the first connector, the resilient holding portion being resiliently deformable; and
a guide portion for absorbing position shifts of the first and second connectors by inclining the adapter with respect to the first connector while resiliently deforming the resilient holding portion,
wherein an accommodation recess for accommodating the resilient holding portion is formed in an outer periphery of a movable dielectric constituting the adapter.

2. The connector device of claim 1, wherein the resilient holding portion is integrally formed to a first dielectric constituting the first connector.

3. The connector device of claim 1, wherein the adapter is held in the fixed posture with respect to the first connector by a movable outer conductor constituting the adapter resiliently coming into contact with the resilient holding portion.

4. The connector device of claim 3, wherein the movable outer conductor is formed with:

a holding contact portion for coming into contact with the resilient holding portion; and a contact point portion separated from the holding contact portion in a facing direction of the first and second connectors, the contact point portion resiliently coming into contact with a first dielectric constituting the first connector.

5. The connector device of claim 4, wherein:

the holding contact portion is formed by recessing an inner peripheral surface of the movable outer conductor, and a projection for coming into contact with the holding contact portion is formed on an outer surface of the resilient holding portion.

6. The connector device of claim 5, wherein:

the resilient holding portion comprises a pair of resilient holding portions, the pair of resilient holding portions are arranged vertically apart from each other; the projection comprises a pair of projections, and the adapter is rockable in a horizontal direction with the pair of projections as a fulcrum.

7. The connector device of claim 5, wherein:

the resilient holding portion comprises a pair of resilient holding portions which face each other in a direction perpendicular to an axial direction of the first connector and are disposed apart from each other, and the accommodation recess comprises a pair of accommodation recesses to accommodate the pair of resilient holding portions, respectively.

* * * * *